(12) United States Patent
Gorintin et al.

(10) Patent No.: US 10,230,142 B2
(45) Date of Patent: Mar. 12, 2019

(54) ENERGY GENERATION SYSTEM COMBINING A FUEL CELL AND A RECHARGEABLE BATTERY AND METHODS IMPLEMENTING SUCH A SYSTEM

(71) Applicant: ENGIE, Courbevoie (FR)

(72) Inventors: Louis Gorintin, Montrouge (FR); Julien Werly, Ermont (FR); Tanguy Leveder, Montreuil (FR)

(73) Assignee: ENGIE, Courbevoie (FR)

( * ) Notice: Subject to any disclaimer, the term of this patent is extended or adjusted under 35 U.S.C. 154(b) by 0 days.

(21) Appl. No.: 15/327,589

(22) PCT Filed: Jul. 23, 2015

(86) PCT No.: PCT/FR2015/052047
§ 371 (c)(1),
(2) Date: Jan. 19, 2017

(87) PCT Pub. No.: WO2016/012728
PCT Pub. Date: Jan. 28, 2016

(65) Prior Publication Data
US 2017/0149108 A1    May 25, 2017

(30) Foreign Application Priority Data

Jul. 23, 2014 (FR) .................................. 14 57127
Sep. 18, 2014 (FR) .................................. 14 58823

(51) Int. Cl.
*H02J 7/00* (2006.01)
*H01M 16/00* (2006.01)
(Continued)

(52) U.S. Cl.
CPC ......... *H01M 16/006* (2013.01); *H01M 8/004* (2013.01); *H01M 8/0618* (2013.01);
(Continued)

(58) Field of Classification Search
USPC ....................................................... 320/101
See application file for complete search history.

(56) References Cited

U.S. PATENT DOCUMENTS 5,332,630 A    7/1994  Hsu
7,615,304 B2   11/2009 Ferrall et al.
(Continued)

FOREIGN PATENT DOCUMENTS

JP    2004-112852 A    4/2004
JP    2006-344488 A    12/2006
(Continued)

OTHER PUBLICATIONS

International Search Report dated Nov. 9, 2015 (4 pages including English translation) out of PCT priority Application No. PCT/FR2015/052047.
(Continued)

*Primary Examiner* — Mohammed Alam
(74) *Attorney, Agent, or Firm* — Brinks Gilson & Lione; John C. Freeman

(57) ABSTRACT

A system for generating low-power energy includes a fuel cell supplied by a gas network and a rechargeable energy storage system. An energy generation method and an energy management method implementing such an energy generation system are described.

11 Claims, 3 Drawing Sheets

(51) Int. Cl.
*H01M 8/243* (2016.01)
*H01M 8/00* (2016.01)
*H01M 8/0612* (2016.01)
*H01M 8/0662* (2016.01)
*H01M 8/124* (2016.01)

(52) U.S. Cl.
CPC ....... *H01M 8/0675* (2013.01); *H01M 8/0687* (2013.01); *H01M 8/243* (2013.01); *H02J 7/007* (2013.01); *H02J 7/0042* (2013.01); *H01M 8/0612* (2013.01); *H01M 8/0662* (2013.01); *H01M 2008/1293* (2013.01); *H01M 2220/10* (2013.01); *H01M 2250/10* (2013.01); *Y02B 90/14* (2013.01); *Y02E 60/525* (2013.01)

(56) References Cited

U.S. PATENT DOCUMENTS

| | | | | |
|---|---|---|---|---|
| 2002/0136939 | A1* | 9/2002 | Grieve | B60L 11/1881 |
| | | | | 429/415 |
| 2003/0168263 | A1* | 9/2003 | Botti | B60K 6/24 |
| | | | | 180/65.1 |
| 2011/0300457 | A1* | 12/2011 | Kuehn | H01M 8/04007 |
| | | | | 429/410 |
| 2013/0101873 | A1* | 4/2013 | Dionne | F01K 27/02 |
| | | | | 429/9 |
| 2015/0143806 | A1* | 5/2015 | Friesth | F24S 25/50 |
| | | | | 60/517 |
| 2017/0149108 | A1* | 5/2017 | Gorintin | H02J 7/007 |

FOREIGN PATENT DOCUMENTS

| | | |
|---|---|---|
| JP | 2007-123275 A | 5/2007 |
| JP | 2007-155188 A | 6/2007 |
| JP | 2007-228685 A | 9/2007 |
| JP | 2007-294296 A | 11/2007 |
| JP | 2009-206106 A | 9/2009 |
| JP | 2011-182384 A | 9/2011 |
| JP | 2013-131449 A | 7/2013 |
| JP | 2014-110590 A | 6/2014 |
| JP | 2014-110718 A | 6/2014 |
| JP | 2015-041472 A | 3/2015 |
| WO | WO 2007/142169 | 12/2007 |
| WO | WO 2010/103269 | 9/2010 |

OTHER PUBLICATIONS

Written Opinion dated Nov. 9, 2015 (6 pages) out of PCT priority Application No. PCT/FR2015/052047.

Office Action, and English language translation thereof, in corresponding Japanese Application No. 2017-524117, dated Dec. 7, 2017, 5 pages.

* cited by examiner

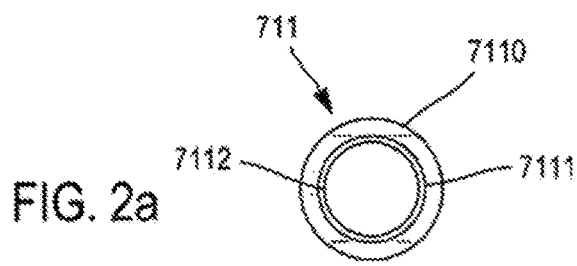
FIG. 2a
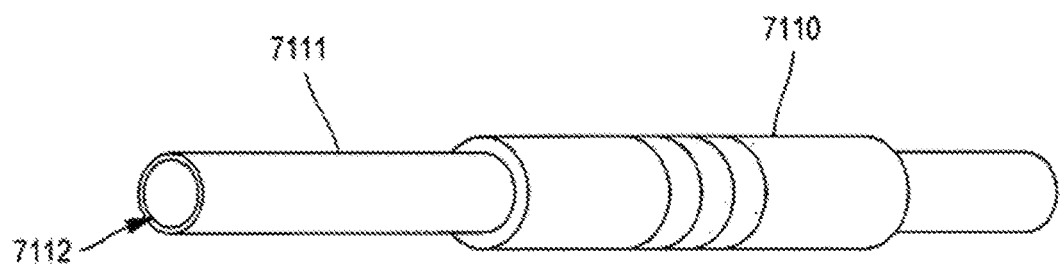
FIG. 2b
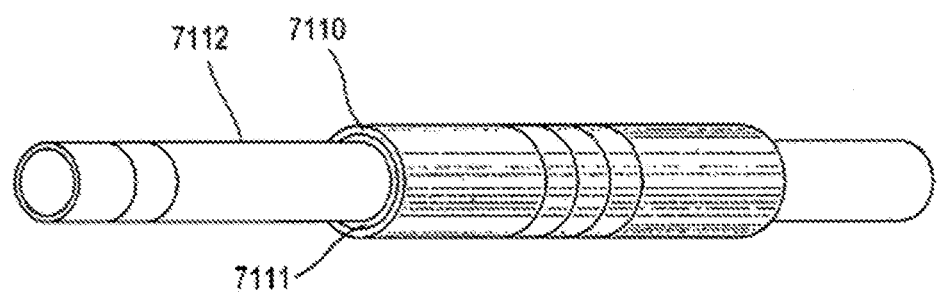
FIG. 2c
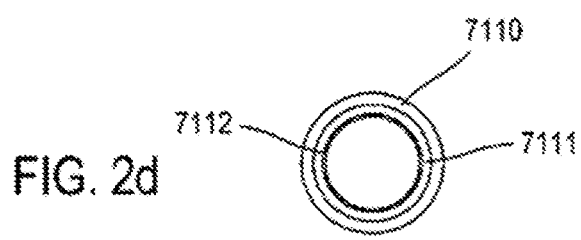
FIG. 2d
FIG. 2

ENERGY GENERATION SYSTEM COMBINING A FUEL CELL AND A RECHARGEABLE BATTERY AND METHODS IMPLEMENTING SUCH A SYSTEM This application claims priority to International Application No. PCT/FR2015/052047 filed Jul. 23,2015; French Application No. 1457127 filed Jul. 23, 2014; and French Application No. 1458823 filed Sep. 18, 2014; the entire contents of each are incorporated herein by reference.

BACKGROUND

The present invention relates to the field of energy harvesting systems for powering electronic systems with electrical energy.

More particularly, the present invention relates to an energy generation system comprising a fuel cell. The present invention relates also to an energy generation method and an energy management method implementing such a device.

SUMMARY

The electronic systems, in particular the measurement systems (or sensors), present in the industrial environment, are becoming increasingly lower energy consumers and are communicating more and more by radiofrequency systems. Given these factors, the energy autonomy of these electronic systems is an issue that is coming increasingly under the spotlight. These days, their power supply is ensured either by the mains, or by electrochemical cells (oxydo-reduction reaction). These power supply solutions have a cost, limited energy levels and technical deployment constraints.

The objective today is to give electronic systems the capacity to function for years without human intervention. The installed products all want to lean toward the same philosophy which is referred to by the expression "install and forget", which is the equivalent of "plug and play" in multimedia peripheral devices. These systems must, from their installation, be integrated in their environment, from both communication and power supply points of view.

The problem with electronic systems, in addition to their main functions (sensor, actuator), is how to minimize the costs linked to their power supply by finding energy present in their environment.

Now, the environment of the electronic systems is not always energy-rich and this limitation of the energy source limits their functionalities.

Currently, there are three solutions for supplying an electronic system with energy:

power supplied by the mains when it is physically and financially possible to bring a cable to the system to be powered;

power supply by oxydo-reduction cell;

power supply by an energy harvesting system which harvests the energy present in the environment. This source of energy can be radiative, thermal, mechanical, or chemical. To increase the time interval between two maintenance periods, a solution of power supply by batteries recharged by virtue of the energy harvested from the ambient environment via a transducer can be considered.

In the case of an electronic system powered by the mains, this solution presents the following drawbacks:

Physical drawback: a system placed in a location that is difficult to access does not make it possible to install cables to power it.

Financial drawback: the cost of such a power supply becomes prohibitive when the system is far from the electrical network.

The solution of a power supply for the electronic systems by cells also presents drawbacks, and in particular:

the life of the system, without maintenance, depends on the life of the cells which is linked to their technology, their capacity as a function of the consumption of the electronic system, their volume which prevents them being installed when the space available is reduced, and their weight;

the cost of the maintenance which necessitates repeated replacement of the cells during the life cycle of the electronic system.

The energy harvesting solution of the type harvesting radiative, mechanical and thermal energies also presents drawbacks, and in particular:

the energy available is dependent on the environment;

the energy present in the environment is not always sufficient;

the quantity of energy can be limited in terms of maximum power;

the assessment and the prediction of available energy can sometimes be complex.

The gas supply networks represent, by the gas that they transport, a source of unlimited energy for the sensors installed on these networks. Fuel cell solutions operating on natural gas do exist. They are ill-suited to the solutions for powering small electronic systems and more often than not operate at high temperature and have limited operating lifetimes. The difficulty here lies on three points:

difficulty in having a fuel cell which operates on natural gas with all of these components, life of the fuel cells, notably solid oxide fuel cells (commonly referred to by the acronym SOFC), which is nowadays not technically sufficient to operate continuously on a gas network, problems of operation of the fuel cells of SOFC type linked to the presence of sulfur elements in the natural gas.

Of the three abovementioned solutions for supplying an electronic system with energy, the third, energy harvesting-type solution is, currently, the most interesting for powering electronic systems, in terms of both logistics and cost. The limitation of the radiative, mechanical and thermal energies is still the energy available in the environment.

In the context of the powering of an electronic system present on a natural gas network, the available energy source in the environment of the pipelines, present in abundance and unlimited quantities, is still natural gas.

However, exploiting it is problematical, because the fuel cells have a limited lifetime and demand high-temperature reforming systems that are often complicated to operate at low temperature without a third party energy input (electrical connection).

To solve the abovementioned defects and drawbacks, the applicant has developed an energy generation system combining a fuel cell and a rechargeable battery, in which the fuel cell can operate with the gas used on the standard gas network and be powered with oxygen from the air. Such a device makes it possible to continuously power an energy consumer, such as an electronic system such as a measurement system (sensor), radio communication system, an actuator, a mechanical, sound or light alarm system.

Continuously powering an energy consumer should be understood, within the meaning of the present application, to mean a powering of the energy consumer without possible interruption or interruption of supply in the power supply, and not a continuous power supply with a current.

A gas network should be understood, within the meaning of the present application, to mean a gas distribution network, but also the gas networks internal to civilian or industrial installations, the gas transport network, gas storage facilities, liquefied natural gas (LNG) supply systems and oil and gas extraction platforms.

The combination of a fuel cell and of an electrical energy storage device is known from the prior art.

Thus, the international application WO 2007/142169 notably describes a fuel cell comprising a capacitor for storing up electrical energy, and the method for using said cell. However, this patent describes the use of the electrical energy stored for the cell itself and not for powering another system, as is the case in the present invention. Furthermore, WO 2007/142169 does not describe the rating of the cell/battery pairing and its operation in relation to the rating.

The subject of the present invention is therefore an energy generation system intended to be connected to a gas network, said generation system comprising:

a gas intake duct from said network into said energy generation system, an effluent discharge duct ($CO_2$, $H_2O$, and $O_2$, effluents not being allowed to endanger the system, the gas network or a third party), an energy generation unit comprising a fuel cell, which is supplied with gas by a branch connection connected to said intake duct, the gas in the branch connection being able to be moved by pressure difference using a pump, or by a naturally existing pressure gradient, and supplied with oxygen by an air intake duct, a management module comprising a management device for said fuel cell, said system being characterized in that the fuel cell is a solid oxide fuel cell (usually referred to by the acronym SOFC), and in that the energy generation unit also comprises a rechargeable electrical energy storage system (for example a rechargeable battery) associated with said fuel cell, and the management module also comprises a management device for the electrical storage system for controlling the charge thereof.

Advantageously, the energy generation system is suitable for continuously supplying an energy consumer consuming on average an energy of between 1 and 100 mW.

The energy generation system according to the invention is an ambient energy harvesting solution, because it makes it possible to avoid using an energy reserve and therefore limits the maintenance or recharging operations. There is therefore no gas storage in the energy generation system according to the invention.

Furthermore, while the energy generation system according to the invention is suitable for continuously powering an energy consumer, the fuel cell in this system does not however operate continuously, but intermittently, that is to say only to recharge the electrical storage system (usually a battery), the frequency of this recharging being able to be between a few hours and a year depending on the consumption of the electronic system to be powered. The energy reserve is therefore rated such that its desired discharge level is reached at the end of this period. In effect, a fuel cell has a limited life in time through two phenomena:

the number of on/off cycles the operating time.

On the other hand, a fuel cell does not have a calendar life. That means that a fuel cell may, in theory, never have operated in ten years and have the same number of on/off cycles and the same number of operating hours as if it were new.

The life of a fuel cell can be between 1000 and 100 000 hours for the most efficient, but typically, the life of a fuel cell is of the order of 5000 hours. Given that there are 8760 hours in a year, a fuel cell having an operating life of 5000 hours cannot operate for longer than a year continuously.

With the energy generation system according to the invention combining an SOFC fuel cell with an electrical energy storage system such as a battery, it is possible to store the energy produced without having to supply energy permanently.

Moreover, a fuel cell used alone has a reaction time that is far too long (typically several seconds) in relation to the current peaks necessary to power a sensor. The combination of the fuel cell with an electrical energy storage system (such as a battery) in the energy generation system according to the invention makes it possible to provide a buffer between the quantity of energy demanded by the sensor and the energy that can be delivered by the fuel cell.

In the energy generation system according to the invention, the fuel cell is a solid oxide fuel cell SOFC, which makes it possible to operate with different types of hydrocarbons and also hydrogen. It comprises a reforming system for transforming hydrocarbons into hydrogen.

The gas supplying the energy generation unit can be natural gas, a liquefied natural gas, an evaporation gas derived from LNG, a town gas, a biogas, biomethane, substitute natural gas or hydrogen.

Biogas should be understood, within the meaning of the present application, to mean a gas derived from the methanation of biomass or second generation biogas.

The branch connection connecting the fuel cell to the intake duct can be controlled by an actuator or by permeation. This branch connection system makes it possible to recover the oxidant in the pipeline.

Advantageously, the solid oxide fuel cell SOFC of the energy generation system according to the invention can be thermally insulated by a thermal insulation system and can comprise a heating system (the temperature being raised and maintained by electronic or chemical heating (combustion for heating said fuel cell.

For that, the solid oxide fuel cell preferably comprises a tubular or microtubular structure, which consists of a system of tube form. This format is more resistant to the thermal expansions of the materials and associated mechanical stresses, and therefore makes it possible to avoid the accelerated aging associated with these thermal expansion phenomena. Other architectures are not however excluded from the present invention.

Advantageously, the management device for the electrical energy storage system can be an electronic device for managing the energy supply for the fuel cell.

Advantageously, the energy generation system according to the invention can comprise, at the input of the gas intake duct and upstream of the fuel cell, a passive desulfurization filter making it possible to eliminate the sulfur molecules present in the gas, which are damaging to the operation of the fuel cell.

Advantageously, the energy generation system according to the invention can also comprise a discharge system or a treatment system for the effluents produced by the fuel cell ($CO_2$, $H_2O$ and $O_2$). An effluent discharge system makes it possible to avoid effluent wastes which would be hazardous for a third person or for the gas network.

Another subject of the present invention is also an energy management method implementing an energy generation system intended to be connected to a gas network, the energy generation system comprising a gas intake duct from said network into said energy generation system, an effluent discharge duct, an energy generation unit comprising a solid oxide fuel cell SOFC, which is supplied with gas by a branch connection connected to said intake duct, and supplied with oxygen by an air intake duct, a rechargeable electrical energy storage system associated with said fuel cell, a management module comprising a management device for said fuel cell and a management device for said electrical storage system for controlling the charge thereof, said method being characterized in that the management module starts up the fuel cell when the electrical energy storage system, having an energy of between 0.1 Wh and 100 Wh, is discharged to a threshold predetermined as a function of the desired life of the energy generation unit.

Advantageously, in the energy management method, the management module can start up the fuel cell when the electrical energy storage system is discharged to a threshold of between 60 and 99% of the storage capacity, and preferably between 70 and 90% of the storage capacity for a power supply duration of between 5 and 20 years.

Another subject of the present invention is also an energy generation method implementing an energy generation system intended to be connected to a gas network, said energy generation system comprising:

a gas intake duct from said network into said energy generation system, an effluent discharge duct, an energy generation unit comprising a solid oxide fuel cell SOFC, which is supplied with gas by a branch connection connected to said intake duct, and supplied with oxygen by an air intake duct, a rechargeable electrical energy storage system associated with said fuel cell, a management module comprising a management device for said fuel cell and a management device for said electrical storage system for controlling the charge thereof, said method being characterized in that the fuel cell continuously supplies an energy consumer consuming on average an energy of between 1 mW and 1 W.

In the energy generation method according to the invention, the energy storage system can also be used to switch on the fuel cell and switch it back on if necessary.

Preferably, in the energy generation method according to the invention, the fuel cell can continuously supply an energy consumer consuming on average an energy of between 1 mW and 100 mW. Below 1 mW, the solution of a power supply by the energy generation system according to the invention is no longer economically competitive and above 100 mW, the technical constraints become too great.

Whether for the energy management method according to the invention or the energy generation method according to the invention, the fuel cell can advantageously comprise a thermal insulation system and a heating system for heating said fuel cell.

For that, the solid oxide fuel cell will preferably be able to comprise a tubular or microtubular structure, which consists of a system of tube form. This format is more resistant to the thermal expansions of the materials and associated mechanical stresses, and therefore makes it possible to avoid the accelerated aging associated with these thermal expansion phenomena. Advantageously the electric management device triggers the start up of the fuel cell when the capacity of the electrical energy storage system is discharged to a threshold of between 60 and 99% of the storage capacity, and preferably between 70 and 90% of the storage capacity, for a power supply duration of between 5 and 20 years.

Advantageously, the storage device will be rated so as to optimize the power supply duration according to the performance criteria of the fuel cell technology and of said electricity storage system the minimum rating follows the equations below:

Given

D the calendar life of the cell with an operating power $P_{fct}$ d the power supply duration desired for the consumer $C_{min}$ the minimum capacity of the battery P the necessary continuous power $N_{PaC}$ the number of cycles of the fuel cell $N_{stock}$ the number of cycles of the storage system $N_{min} = \min(N_{PaC}, N_{stock})$ If the cyclability of the fuel cell is greater than the cyclability of the storage otherwise α (as %) trigger threshold according to the battery technology $E_{pile}$ the total energy that can be generated by the cell:

$$E_{pile} = D * P_{fct} \qquad (1)$$

$$E_{pile} > d * P \qquad (2)$$

$$C_{min} = \alpha * E_{pile}/N_{min} \qquad (3)$$

The factor α is linked to the electrical storage technology used and must take into account:

Whether for the energy management method according to the invention or the energy generation method according to the invention, the electronic management device for the electrical energy storage system can also manage the supply of fluid for the fuel cell and the supply of electrical energy for the electrical consumer (for example a sensor), as follows:

the electronic management device triggers the startup of the fuel cell when the capacity of the electrical energy storage system is discharged to a predetermined threshold, for a power supply duration of between 5 and 20 years.

Advantageously, the electronic management device can trigger the startup of the cell The self-discharging of the electrical storage;

electrical storage capacity as a function of the operating temperature;

calendar life of the electrical storage;

reduction of the capacity of the electrical storage as a function of time;

capacity of the electrical storage to supply current peaks for power demands.

Depending on the storage types a can have a value of between 1.5 and 3.

Whether for the energy management method according to the invention or the energy generation method according to the invention, the energy generation system can also comprise, upstream of the fuel cell, a passive desulfurization filter making it possible to eliminate the sulfur molecules present in the gas.

Whether for the energy management method according to the invention or the energy generation method according to the invention, the energy generation system can also comprise a discharge system or a treatment system for the effluents produced by the fuel cell.

Whether for the energy management method according to the invention or the energy generation method according to the invention, the gas can be natural gas, a liquefied natural gas, an evaporation gas derived from LNG, a town gas, a biogas, biomethane, substitute natural gas or hydrogen.

BRIEF DESCRIPTION OF THE DRAWINGS

Other advantages and particular features of the present invention will result from the following description, given as a non-limiting example and with reference to the attached figures:

FIGS. 2a and 2b respectively represent a cross-sectional view (FIG. 2a) and a side view (FIG. 2b) of a first exemplary embodiment of a fuel cell with tubular structure;

FIGS. 2c and 2d respectively represent a side view (FIG. 2c) and a cross-sectional view (FIG. 2d) of a second exemplary embodiment of a fuel cell with tubular structure;

DETAILED DESCRIPTION

The identical elements represented in FIGS. 1 to 4 are identified by identical numerical references.

Figure 1:
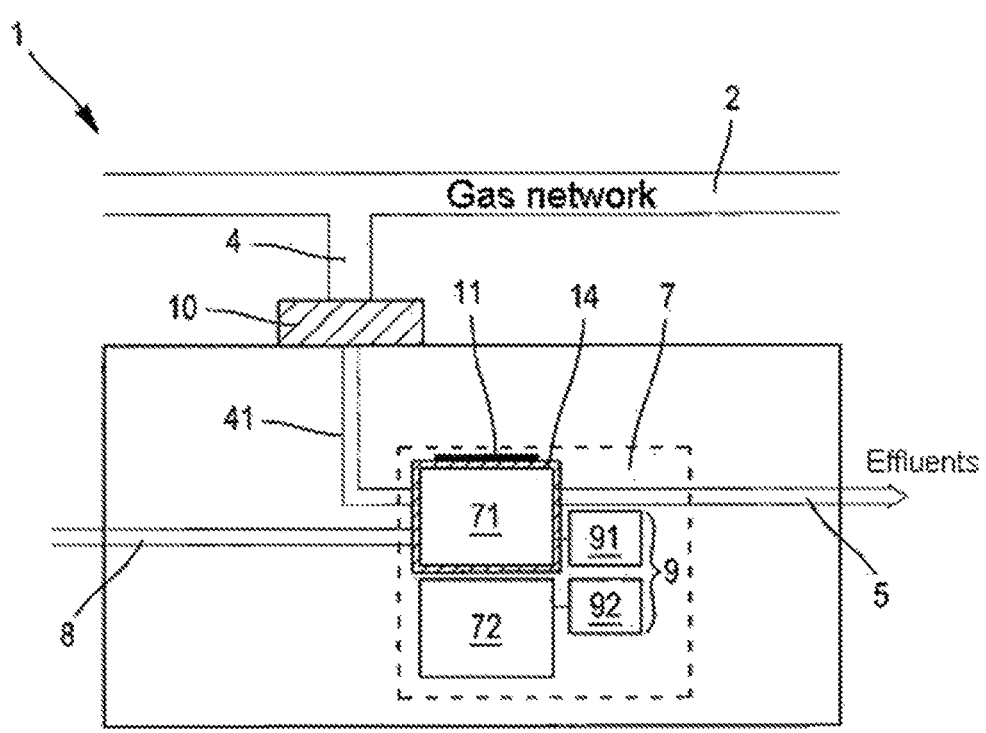
FIG. 1 represents a general theoretical diagram of the energy generation system according to the invention.

In FIG. 1, a general theoretical diagram of the energy generation system 1 according to the invention is represented, connected to a standard gas network 2. FIG. 1 shows that the gas from the network 2 is introduced, via a gas intake duct 4 connected to the gas network 2, into the energy generation system 1. The intake duct 4 is connected to a branch connection 41 which supplies gas, in the energy generation system 1, to a solid oxide fuel cell 71 (SOFC). The latter is also supplied with oxygen by an air intake duct. The effluents produced by the fuel cell ($CO_2$, $H_2O$ and $O_2$) are eliminated from the energy generation system via an effluent discharge duct 5. The operation of the fuel cell 71 is managed by a management device 91 of a management module 9. In the energy generation system 1, the fuel cell 71 is combined, in an energy generation unit 7, with a rechargeable electrical energy storage system 72, which is managed by a specific management device 92, also forming part of the management module 9. This management device 92 makes it possible to control the charge of the electrical storage system 72. FIG. 1 also shows that a thermal insulation system 14 is placed around the fuel cell 71, on which 14 is arranged an electrical resistor II.

The tubular structure of the fuel cell is represented in more detail in FIGS. 2a to 2d.

FIGS. 2a and 2b respectively represent a cross-sectional view (FIG. 2a) and a side view (FIG. 2b) of a first exemplary embodiment of this tubular structure, which consists of a thick electrolyte support tube 7111 (notably made of ceramic), coated on the outside with an outer cathode layer 7110 and on the inside with a thin anode layer 7112.

FIGS. 2c and 2d respectively represent a side view (FIG. 2c) and a cross-sectional view (FIG. 2d) of a second exemplary embodiment of this tubular structure, which consists of a thick anode support tube 7112, coated in succession from the tube with a layer of electrolyte 7111, then an outer cathode layer 7110.

Figure 3:
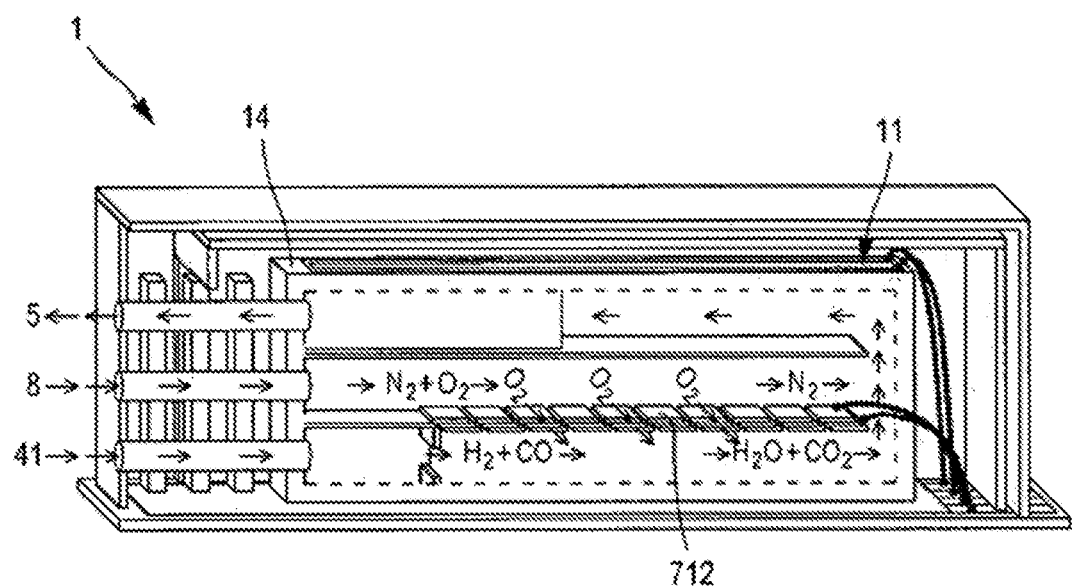
FIG. 3 represents a cross-sectional schematic view of an energy generation system according to a second variant embodiment of the invention, in which the solid fuel cell has a microtubular structure.
Figure 4:
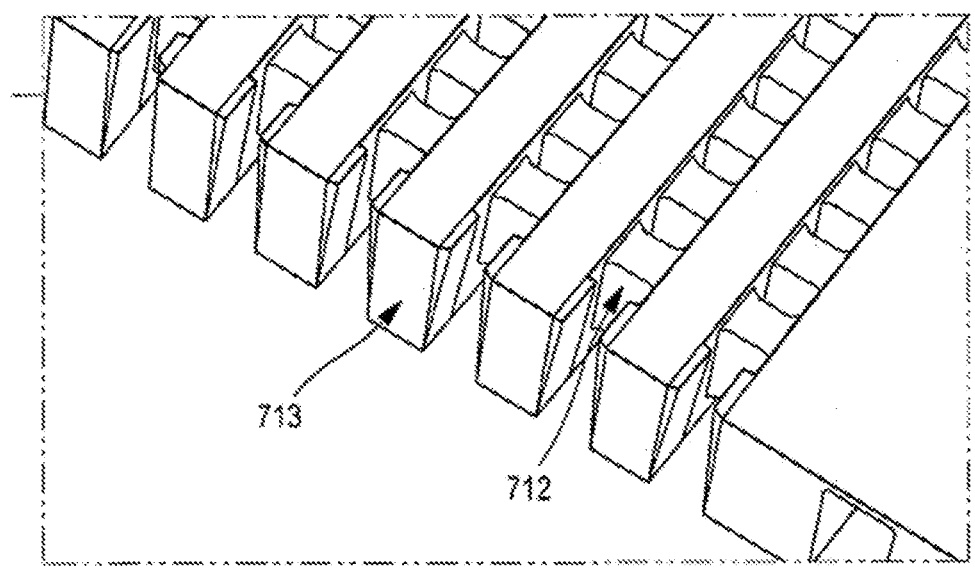
FIG. 4 represents a perspective schematic view of a set of microtubes of the fuel cell of FIG. 4.

FIG. 3 represents a cross-sectional schematic view of an energy generation system 1 according to a second variant embodiment of the invention, in which the solid fuel cell 71 comprises a microtubular structure, which consists of rows of microtubes 712, separated from one another by separators 713, as illustrated in FIG. 4. FIG. 3 also shows that a thermal insulation system 14 is placed around the fuel cell 71, on which 14 is arranged an electrical resistor II.

The following examples illustrate the invention without however limiting the scope thereof.

EXAMPLES

Example 1

Power Supply for an Energy-Independent Gas Monitoring System (Pressure, Flow Rate, Temperature)

The system according to the invention is used to supply energy to an industrial programmable logic control system for tracking gas usually referred to by the acronym RTU (remote terminal unit), which transmits the information linked to the measurements by wire or by radio waves. The power supply for the system is produced via the 220 V network and, when not possible, cells are used.

When the power supply by cell is chosen, the transmission of the data is produced by radiofrequency wave and the energy autonomy depends on the use of the RTU and on the capacity of the cells.

In the context of an RTU installed on an expansion station, the target autonomy is 2 years and the average consumption is 20 mW. According to the invention, a power supply solution by fuel cell proposes an acquisition cost two times greater than an RTU, but an operating cost four times lower. The return on investment is estimated at 4 years with these assumptions which are pessimistic assumptions. For example, an electrical consumer which consumes on average 20 mW, an $N_{min}$ of 250 and an alpha factor of 1.5 necessitates an 18 Wh battery, if it is recharged every fortnight and have a life of 10 years.

This example shows that the use of a system according to the invention allows for savings from an economic point of view.

Example 2

Example of Rating of an Energy Generation System According to the Invention

For the rating of an energy generation system according to the invention, the case of use chosen tries to be as representative as possible to the requirements that can be encountered in terms of consumption and of life of the sensor:

the operating life of the fuel cell is 5000 hours, the sensor, powered via a battery, consumes 10 mA on average at 3.3 V, or a power of 33 mW.

The period between two maintenance phases is 10, 15 or 20 years.

Table I below presents the approach followed to rate a fuel cell that meets the energy need of the case of use described in the present example. The left-hand column gives the issues, in order, that it has to address, whereas the right-hand column shows three different ways of addressing these issues for three different periods without maintenance (10, 15 and 20 years).

According to this table, a fuel cell having an operating life of 5000 hours and a power of 2 W can, over 20 years (operating 250 h/year) power a system (=recharge a battery powering the sensor) which consumes on average 10 mA at 3.3 V.

TABLE I

| Power supply voltage | 10 mA on average, or 87.6 h/year | 10 mA on average, or 87.6 h/year | 10 mA on average, or 87.6 h/year |
|---|---|---|---|
| Consumption of the sensor | 3.3 V | 3.3 V | 3.3 V |
| Energy necessary over a year | 289 Wh/year | 289 Wh/year | 289 Wh/year |
| Period between two maintenance phases | 10 years | 15 years | 20 years |
| Life of the fuel cell in operating hours | 5000 hours | 5000 hours | 5000 hours |
| Number of hours of operation per year to reconcile the life of the fuel cell and the gap between two maintenance phases | 500 hours/year | 333 hours/year | 250 hours/year |
| Power that the fuel cell must supply in its operating phases | 0.6 W | 0.9 W | 1.2 W |
| Total efficiency (taking into account different transfer efficiencies) | 64% | 64% | 64% |
| Real power that the fuel cell must supply in its operating phases at 50% of its power | 1.8 W | 2.8 W | 3.6 W |
| Minimum battery capacity | 18 Wh | 27 Wh | 36 Wh |

The invention claimed is:

1. An energy management method implementing an energy conversion system intended to be connected to a gas network, the energy conversion system comprising:
   a gas intake duct from the gas network into the energy conversion system;
   an effluent discharge duct;
   an energy conversion unit comprising a solid oxide fuel cell (SOFC) that is supplied with gas by a branch connection connected to the gas intake duct, and supplied with oxygen by an air intake duct;
   a rechargeable electrical energy storage system associated with the solid oxide fuel cell;
   a management module comprising a first management device for the solid oxide fuel cell and a second management device for the rechargeable electrical storage system for controlling charge thereof;
   wherein the management module starts up the solid oxide fuel cell when the rechargeable electrical energy storage system, having an energy of between about 0.1 Wh and about 100 Wh, is discharged to a threshold predetermined as a function of a desired life of the energy conversion unit.

2. The method according to claim 1, wherein the management module starts up the solid oxide fuel cell when the electrical energy storage system is discharged to a threshold of between about 60% and about 99% of storage capacity for a power supply duration of between about 5 years and about 20 years.

3. An energy generation method implementing an energy conversion system intended to be connected to a gas network, the energy conversion system comprising:
   a gas intake duct from the gas network into the energy conversion system;
   an effluent discharge duct;
   an energy conversion unit comprising a solid oxide fuel cell (SOFC) that is supplied with gas by a branch connection connected to the gas intake duct and supplied with oxygen by an air intake duct;
   a rechargeable electrical energy storage system associated with the solid oxide fuel cell;
   a management module comprising a first management device for the solid oxide fuel cell and a second management device for the rechargeable electrical storage system for controlling charge thereof;
   wherein the solid oxide fuel cell continuously supplies an energy consumer consuming on average an energy of between about 1 mW and about 1 W.

4. The method according to claim 3, wherein the fuel cell continuously supplies an energy consumer consuming on average an energy of between about 1 mW and about 100 mW.

5. The method according to claim 1, wherein the solid oxide fuel cell comprises a thermal insulation system and a heating system for heating the solid oxide fuel cell.

6. The method according to claim 5, wherein the solid oxide fuel cell comprises a tubular or microtubular structure.

7. The method according to claim 1, wherein the second management device for the rechargeable electrical energy storage system also manages a supply of fluid for the solid oxide fuel cell and a supply of electrical energy for an electrical consumer and the first management device triggers startup of the solid oxide fuel cell when the capacity of the rechargeable electrical energy storage system is discharged to a predetermined threshold, for a power supply duration of between about 5 years and about 20 years.

8. The method according to claim 7, wherein the first management device triggers the startup of the solid oxide fuel cell when a storage capacity of the rechargeable electrical energy storage system is discharged to a threshold of between about 60% and about 99% of the storage capacity, for a power supply duration of between about 5 years and about 20 years.

9. The method according to claim 1, wherein the energy conversion system further comprises a passive desulfurization filter disposed upstream of the solid oxide fuel cell and configured to eliminate sulfur molecules present in the gas.

10. The method according to claim 1, wherein the energy conversion system further comprises a discharge system or a treatment system for effluents produced by the solid oxide fuel cell.

11. The method according to claim 1, wherein the gas is selected from the group consisting of natural gas, a liquefied natural gas, an evaporation gas derived from LNG, town gas, a biogas, biomethane, substitute natural gas and hydrogen gas.

* * * * *